Oct. 12, 1937.  R. D. JUNKINS  2,095,877
MEASURING AND CONTROLLING APPARATUS
Filed April 28, 1934  2 Sheets-Sheet 2
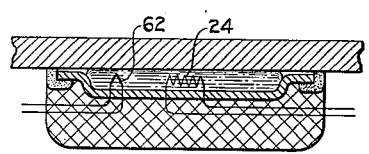
Fig.5
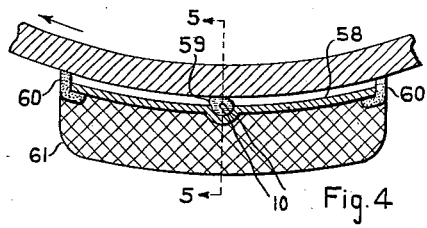
Fig.4
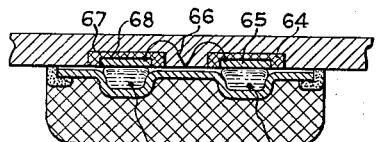
Fig.8
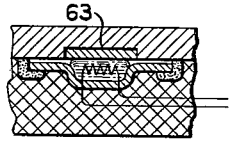
Fig.6
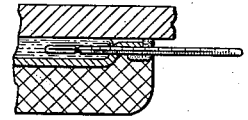
Fig.7
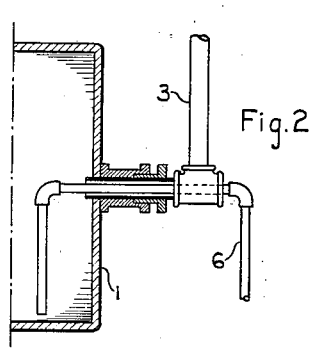
Fig.2
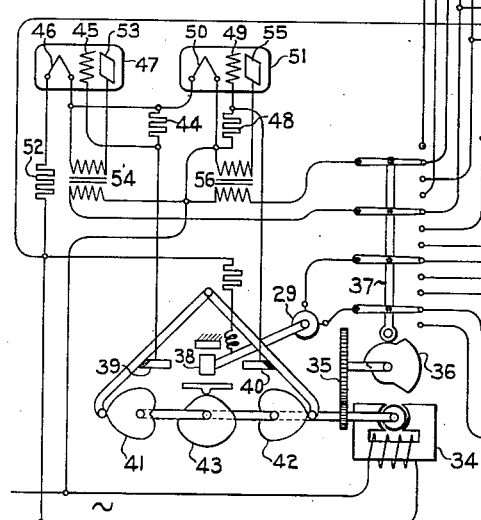
Fig.3
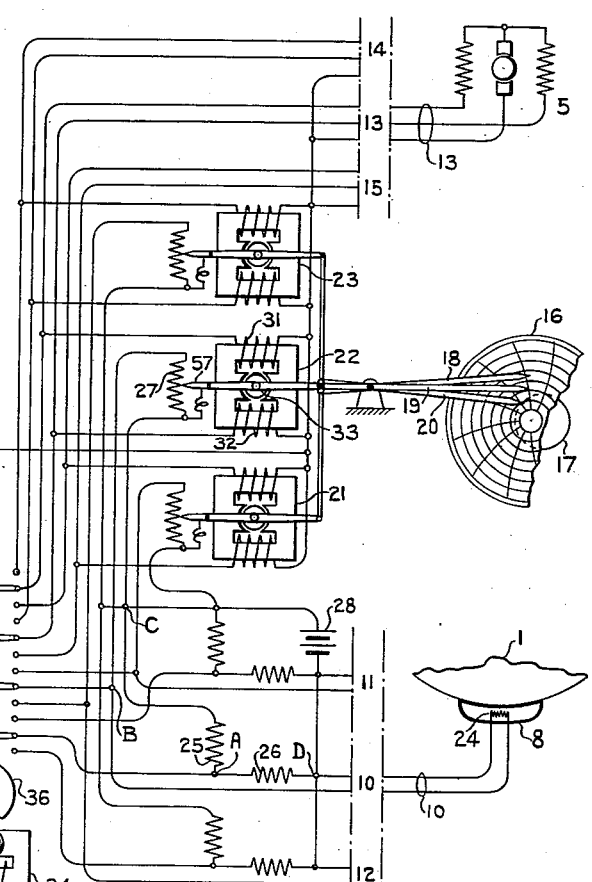
INVENTOR
Raymond D. Junkins
BY
ATTORNEY

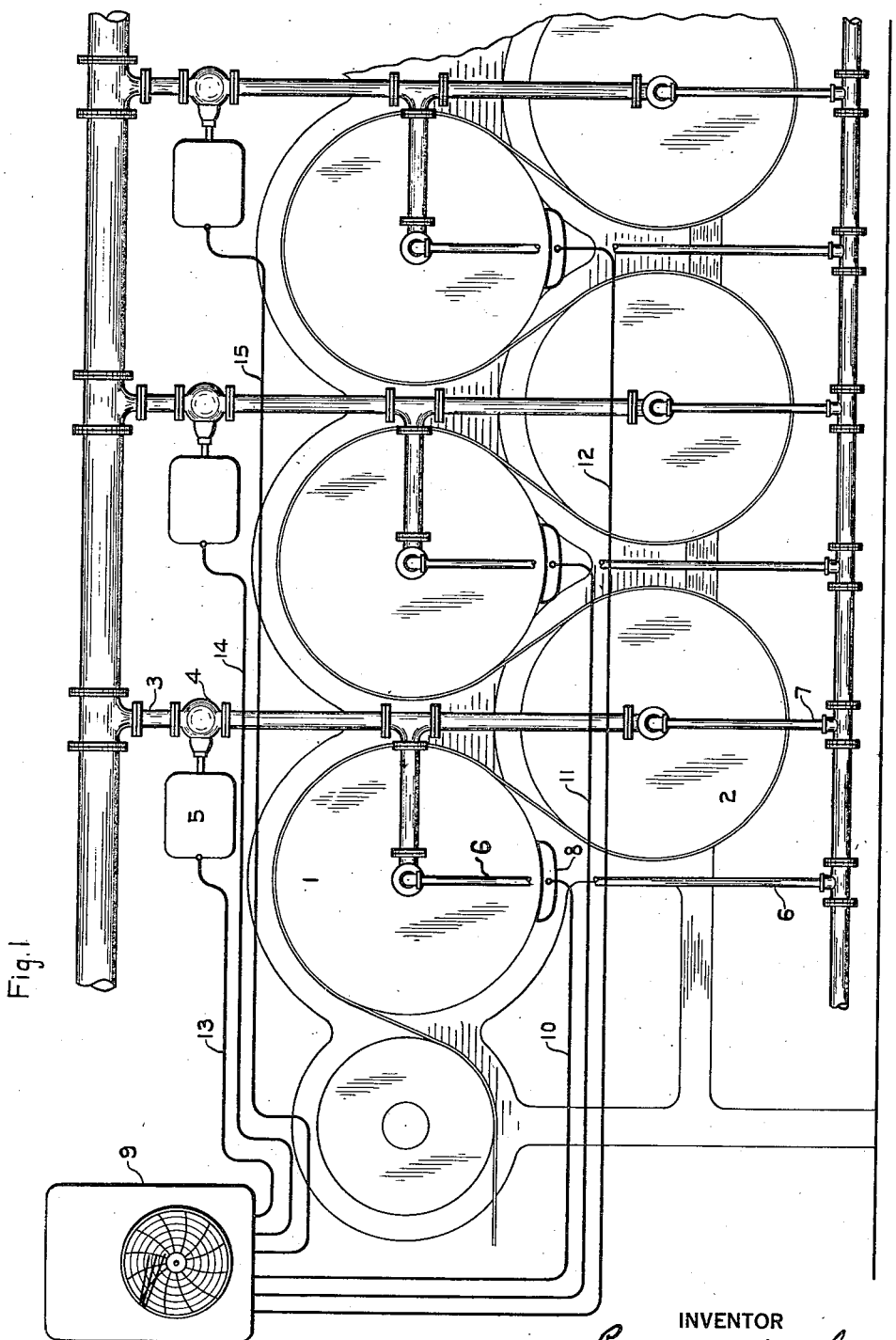

UNITED STATES PATENT OFFICE 2,095,877

MEASURING AND CONTROLLING APPARATUS

Raymond D. Junkins, Cleveland Heights, Ohio, assignor to Bailey Meter Company, a corporation of Delaware Application April 28, 1934, Serial No. 722,902

8 Claims. (Cl. 73—32)

My invention relates to the measurement and/or control of the temperature of heated surfaces and particularly heated surfaces in motion, such as the drying rolls of paper machines or the forming rolls of steel mills.

In certain processes and in the manufacture of certain products, it is important that moving surfaces be heated or cooled and maintained at or near predetermined temperature values. Otherwise, the quantity and quality of the products will suffer.

Heretofore numerous schemes have been proposed for obtaining a continuous temperature reading from such moving heated rolls or surfaces, but subject to many disadvantages and inaccuracies. For example, shoes of various types have been arranged to contact with the surface of the moving heated roll but such shoes tend to score or damage the roll if in contact with the roll, and through such contacting, a variable temperature component due to friction is introduced, dependent upon the force holding the shoe in contact with the roll. If the shoe does not contact with the surface of the roll but is arranged with an air gap therebetween, then a temperature reading is obtained which is not representative of the surface temperature of the roll but of the film of air sweeping between the shoe or other temperature responsive member and the surface of the roll or sheet of paper or other material carried on the surface of the roll.

My invention provides an improved apparatus for transmitting the temperature of the moving surface to a relatively stationary part, from which the temperature can be determined, and doing this without introducing the component of frictional temperature previously referred to.

A further object is to provide a frictionless heat conducting contact with a moving surface whereby the temperature of the moving surface may be accurately and continuously obtained for visual indication, permanent recording, and/or control.

A further object is the provision of improved recording and control apparatus for a plurality of rolls.

Further objects and advantages will become apparent from a study of the drawings and description pertaining thereto of the accompanying specifications.

While I have chosen to illustrate and describe a preferred embodiment of my invention in connection with the drying rolls of a paper making machine, it will be understood that the invention is equally applicable to measuring and/or controlling the temperature of heated or cooled rolls of textile machinery, metal rolling mills, rubber mills, etc. Furthermore, it may be adapted to obtain the temperature of any moving surface irrespective of whether the movement is one of rotation or linear travel.

In the drawings:

Fig. 1 is an elevation of a part of a paper machine to which the invention has been applied.

Fig. 2 illustrates a sectional elevation of the part of a heated roll.

Fig. 3 is a wiring diagram of the control of Fig. 1.

Figs. 4, 5, 6, 7 and 8 illustrate to enlarged scale a section through the wall of a heated roll to which temperature sensitive means is applied.

Referring first to Fig. 1, I show at 1 and 2, a pair of rolls of a paper making machine. While I have shown in this figure three similar pair of rolls, it is to be understood that in describing the control applied to one pair of the rolls it is equally applicable to another pair or, in general, to a plurality of rolls or a single roll.

Steam for heating the rolls is supplied through a pipe 3 controlled by a valve 4 having a regulator 5. Condensate from the interior of the roll 1 is siphoned by the pipe 6 and from the interior of the roll 2 by the pipe 7, through trunnion bearings of the roll as clearly illustrated in Fig. 2. This is common practice and need not be explained more in detail. It is advisable to point out, however, that such rolls are usually of considerable size and of cast iron with highly polished exterior surface. The wall of the roll is not necessarily of uniform thickness and while in the past it has been attempted to measure the temperature within the roll as representative of the external surface temperature, this has not been found to be accurate or practical for many reasons. Attempts which have been made to actually measure the surface temperature of the heated roll have also been unsatisfactory due to the difficulty of obtaining a measure of such temperature without the introduction of losses by radiation, convection, etc. or increases over this temperature through frictional engagement of the measuring device with the moving surface.

At 8 I indicate my improved temperature sensitive device positioned adjacent the underside of the roll 1. 9 is a temperature recorder-controller to which I have illustrated the connection of the three regulators 5 and the three temperature sensitive devices 8, although it is to be understood that the recorder-controller 9 may be adapted to be sensitive to a lesser or greater number of devices 8 and to control a lesser or greater number of regulators 5 than are shown in Fig. 1. As illustrated, there are three devices 8 connected through the cables 10, 11, 12 with the instrument 9, and three regulators 5 connected through the cables 13, 14, 15 with the instrument 9.

Referring now to Fig. 3, I show at 16 a recording chart of the instrument 9, adapted to be continuously rotated at a uniform speed by the clock motor 17 in common manner. Relative to the chart 16, three recording pens, 18, 19 and 20, are respectively positioned by the motors 21, 22 and 23.

I show a part of the roll 1 and a diagrammatic section through the temperature responsive device 8 containing a resistance element 24. I will more fully describe the resistance element and device 8 hereinafter, but for the moment it will suffice to say that this is an electrical resistance thermometer sensitive to temperature of the surface of the heated roll 1. It is to be understood that while in Fig. 3 I have illustrated only the device 8 to which the cable 10 is connected, the devices 8 connected by the cables 11 and 12 are similar. Similarly I indicate a single regulator 5 in connection with the valve 4 and for positioning same, with the understanding that it is representative of the other regulators 5 of Fig. 1.

In general, the arrangement is such that first one and then another of the devices 8, in predetermined sequence, is connected to the amplifying mechanism of the instrument 9; and simultaneously the proper recording pen is positioned relative to the chart 16, and the related regulator 5 comes under the control of the instrument 9; if since the previous cycle, the temperature of that roll has deviated.

I employ a Wheatstone bridge circuit in which the fixed resistances 25, 26 form two legs, the thermometer resistance 24 forms a third leg, and the adjustable resistance 27 comprises a fourth leg. Across conjugate corners C—D is the potential source 28, while across the opposite corners A—B is the galvanometer 29.

A mechanically periodically actuated feeling device cooperates with the galvanometer needle for the control, upon departure of temperature from predetermined value, of thermionic or electron discharge devices whereby the minute electrical unbalance of the Wheatstone bridge is amplified or magnified for the control of electromagnetic devices such as motors which are utilized as amplified power means for positioning the temperature recorder and the regulator 5.

I show at 22 a motor having opposed windings 31 and 32 connected in an alternating current circuit and oppositely wound in a manner such that when the windings 31, 32 are equally energized, a rotor 33 (with proper gear reduction means) is not urged to rotation in either direction, but when the windings are unequally energized, rotation of the rotor 33 will occur in predetermined direction. Carried by the rotor 33, for angular positioning thereby, is the indicating-recording arm 19 adapted to form a continuous record upon the chart 16.

The regulator 5 is, through the conductors 13, connected in parallel to be energized simultaneously with the motor 22. Thus, the motor 22 for recording and the motor 5 for regulating are adapted to be effective simultaneously responsive to temperature at the resistance thermometer 24.

Upon every change in temperature at the thermometer 24 I effect an angular displacement of the rotor 33 and the rotor of 5 directly proportional to the variation in the temperature, by substantially de-energizing one or the other of the field windings of both motors. The motors are generally of a type wherein if the strength of the fields is equal regardless of magnitude, the motor remains stationary, unurged to rotation in either direction, whereas if the strength of one of the windings predominates over that of the other winding, the motor will rotate in predetermined direction.

In connection with the thermometer 24 and the motors 22, 5, I use a single galvanometer and feeler device whereby I periodically and alternately make effective each of the several resistance thermometers 24 for recording and controlling the temperature related thereto. For such periodic switching I provide a constant speed motor 34 connected directly across the alternating current source, driving through suitable gearing 35 a constantly rotating cam 36 for periodically opening and closing certain circuits. On the drawings I illustrate a switch bar 37 having a roller at its lowermost end and adapted to rise and fall vertically through engagement of the roller with the cam surface of 36. Pivotally fastened to the bar 37 are four switch members, one end of each of which is pivotally connected to a terminal point, while the other end of each is adapted to be moved relative to three possible contact points.

Vertical reciprocation of the bar 37, through periodic rotation of the cam 36, accomplishes a periodic switching whereby the temperature responsive device of one roll is made effective for recording the temperature of that roll upon the chart 16 and simultaneously positioning the control motor 5, and then alternately the same for successive rolls.

It will be observed that with the three units illustrated in Fig. 1 and Fig. 3, I have arranged the cam 36 to have a contour providing three steps dividing the cam into approximate thirds of time rotation. The switch members carried by the bar 37 contact with the lowest of each set of three possible contact points when the roller of the switch bar 37 is on the innermost land of the cam 36. It remains in this contact position for approximately one-third of the time revolution of the cam. During the second third of such revolution, the bar 37 is moved upwardly until the switch arms engage the second of each set of possible contacts, and during the last one-third rotation of the cam 36, the switch bar 37 is moved upwardly to its uppermost contact position. Thus, periodically the switch members carried by the bar 37 are switched from one to another of three possible sets of contact points.

Upon a variation in temperature at the resistance thermometer 24, the galvanometer will become unbalanced and the needle 38 of the galvanometer 29 will be deflected either to the right or to the left (on the drawings) an amount substantially proportional to the variation in temperature. On such a deflection of the galvanometer needle, periodic engagement will be made between the needle and either the contact 39 or the contact 40 which are periodically reciprocated toward or away from the needle 38 by means of continuously rotating cams 41, 42. A third cam 43, simultaneously rotated by the motor 34, is adapted to clamp the needle 38 in its then position so that engagement will be made between the needle and either the contact 39 or the contact 40, depending upon which direction the needle 38 has swung from its central or neutral position. The length of the engagement for closing contact between 38 and either 39 or 40 will depend upon the deviation of the needle from its mid-position, and correspondingly, the magnitude of the temperature change.

I utilize the feeling-amplifying apparatus just described to produce an electrical effect in definite relation to the departure of the galvanometer needle from neutral position and for control of the motors 5, 22. Intermediary between the feeler apparatus and the motors 22, 5 and controlled by a minute electrical force originated through engagement of the galvanometer needle 38 with either the contacts 39 or 40, I interpose electron discharge devices or thermionic valves for controlling an amplified, or substantially greater, electrical force to be directly applied to the motors.

The galvanometer needle 38 is connected directly to one side of the alternating current source through a suitable resistor and will, upon engagement for example with the contact 39, change the normal potential relation maintained by an impedance device shown as the resistance 44, between a grid 45 and cathode 46 of the electron discharge device 47. Likewise, the galvanometer needle is adapted, upon engagement with the contact 40, to change the normal potential relation maintained by an impedance device shown as a resistance 48 between a grid 49 and a cathode 50 of the electron discharge device 51. Current for heating the cathodes 46, 50, which are connected in series, is provided by the alternating current source through a resistor 52.

The plate or anode 53 of the device 47 is connected to the cathode 46 through an output circuit which is provided with current from the secondary of a transformer 54. Similarly, the anode 55 is connected to the cathode 50 through an output circuit which is supplied with current from the secondary of a transformer 56.

The devices 47, 51 are unidirectional in that current flows from the anode 53, 55 to the related cathode 46, 50, and if alternating current is applied to the devices, then pulsating direct current or one-half of the alternating current wave passes through each of the devices when the device is conducting. When, as shown, the galvanometer needle 38 is in engagement with neither the contacts 39, 40, then during a portion of each alternating current cycle the plates or anodes of the devices 47, 51 will bear a positive potential with respect to the related cathode, and the potential relation between the grid and cathode will be such as to allow passage of current through the output circuit comprising the secondary of the related transformer. During the alternate half cycle of the alternating current wave, the potential at the plates of the two devices 47, 51 will be negative with respect to the potential of their respective cathodes, thereby open-circuiting the output circuit of the devices. Thus, a pulsating direct current will flow through each of the devices 47, 51 when they are respectively conducting.

If now the galvanometer needle deflects either to the right or to the left due to a change in temperature and corresponding Wheatstone bridge unbalance, it will engage either the contact 39 or the contact 40. Under this condition, then, for the period of engagement, the normal potential relation between the cathode and grid of the device 47 or the device 51, according to whether the contact 39 or the contact 40 is engaged, will be changed. During that portion of the alternating current cycle when the associated device was normally adapted for passing unidirectional current, the grid will now be sufficiently negative with respect to its cathode that the output circuit of the device will be open-circuited. During the remaining portion of the alternating current cycle, notwithstanding that the grid will have a positive potential with respect to the potential of the cathode, the device will remain open-circuited inasmuch as the plate will be under a negative potential with respect to the potential of the cathode.

It will, therefore, be seen that with the galvanometer needle 38 engaging either of the contacts 39, 40, there will be a unidirectional current flow through the devices 47, 51, and correspondingly, through the secondaries of the transformers 54, 56; but with engagement between the needle 38 and either the contact 39 or the contact 40, one or the other of the devices 47, 51 will be open-circuited for the period of such engagement of contacts.

The fields of the motors 5 and 22 are connected in parallel in the primary circuits of the transformers 54, 56 as may be clearly seen from Fig. 3. The impedance of the primary of a transformer is dependent upon the current flowing in the secondary winding, and thus, the impedance of the primary of a transformer when the secondary winding is open-circuited is relatively great compared to a similar transformer whose secondary winding is close circuited. Under normal conditions, a pulsating direct current will pass through the output circuit of the electron discharge devices which will be of sufficient value to reduce the impedance of the primary windings of the transformers 54, 56 so that the opposed fields of the connected motors will be energized to a substantially normal amount. Inasmuch as the opposed fields of these motors are energized equally, then due to the characteristics of the motors as previously described the rotors will not be urged to rotation in either direction.

However, upon rendering one of the devices 47, 51 non-conducting, a corresponding change in impedance of the primary of the related transformer will vary the strength of the connected field windings and the motors will be allowed to rotate in one direction or the other.

It will, therefore, be apparent that when there is a change in temperature at the resistance thermometer 24, there will be an unbalance of the Wheatstone bridge circuit, of which 24 constitutes one leg and a resulting deflection of the galvanometer needle 38 either to the right or to the left on the drawings. Periodic movement of the contacts 39, 40 toward and away from the needle 38 will then cause engagement between the needle 38 and one or the other of the mentioned contacts, thus properly controlling the electron discharge devices 47, 51 and thereby the transformers 54, 56 whereby the motor 22 is caused to rotate in a direction to position the pen 19 relative to chart 16 for recording the change in temperature, and simultaneously to cause a positioning of the regulator 5 effective upon the control valve 4, to increase or decrease the amount of steam admitted to the roll 1, and thereby tend to return the temperature of the heated surface of the roll to predetermined value.

Through the periodic switching arrangement of the cam 36 and contact bar 37, control is periodically effected to alternately move the recording pens 18, 19, 20 relative to their previous position on the chart 16 if there has been a change in the temperature to which the related thermometer 24 is sensitive. Simultaneously, alternately, the control valves 4 will be positioned for controlling the temperature of the related rolls. I am, therefore, enabled to use a single feeler and amplifying mechanism with a plurality of resistance thermometers, a plurality of recording pens and a plurality of control regulators with the switching arrangement described.

It will be observed that when the rotor 33 is caused to move, through unbalance of the Wheatstone bridge circuit, and thereby position the recording pen 19 relative to the chart 16, the contact arm 57 is simultaneously positioned across the adjustable resistance 27 to effect a rebalancing of the Wheatstone bridge, whereby the galvanometer needle 38 is returned to its neutral position. It is, of course, evident that should the deviation in temperature be great, there may be two or more cam cycles of the cam 43 before the needle 38 is returned to its neutral position and thus two or more impulses sent out to move the motor 22 and the motor 5 before the recording pen has reached a position indicative of the true temperature and before the regulator 5 accomplishes a proper movement to overcome or compensate for the change in temperature.

The gearing 35 and the speed of the motor 34 may be so arranged that the switching from one thermometer 24 to another is accomplished in a few seconds or every few moments as desired. Likewise, the cycle of the cams 41, 42, 43 may be arranged or adjusted as to speed dependent upon the speed or actual change in temperature.

I will now describe in detail the arrangement of the temperature sensitive device 8 positioned adjacent the roll 1 of Fig. 3 and illustrated in greater detail in Figs. 4-8 inclusive.

An important part of my invention lies in the provision of an improved temperature sensitive device for obtaining as nearly a true temperature of the moving surface as possible. At Fig. 4 I show to enlarged scale a section through a portion of the roll wall normal to the axis, and correspondingly, a section through the device 8 adjacent to the heated surface.

I provide a pan or container 58 which may be of metal or of insulating material, rigidly supported adjacent the heated surface, with a very small clearance therebetween. The pan 58 is shaped to substantially conform to the shape of the roll and contains a groove as 59 of relative small sectional area but of any desired length up to the full axial length of the roll. For example, if the drier roll is approximately 48 inches in diameter, then I may make the groove 59 of approximately ½ inch to ¾ inch diameter and the spacing between the pan 58 and the periphery of the roll approximately 1/16 inch to ⅛ inch, depending upon the trueness with which the roll is curved and with which it runs in its bearings. It is desired only that the clearance be kept to a minimum without having any frictional engagement between the pan and the periphery of the roll.

In the long, semi-circular groove 59, I place a quantity of a fluid, preferably mercury, which is known to have a relatively high viscosity or surface tension and meniscus effect so that if freely poured into such a groove, it will rise or form a meniscus approximately ⅛ inch above the surface of the adjacent part of the pan 58. When the pan is positioned adjacent the heated surface of the roll, I arrange the support in such a manner that the long thread of mercury will be in contact with the surface of the roll axially thereof, and to an extent where the meniscus is somewhat flattened down through contact with the roll. In Fig. 4 I further illustrate the roll moving in a clockwise rotation, tending to slightly pull the mercury meniscus toward the left on the drawings from the flattened condition which would be present were the roll stationary or not in rotation.

I have found that mercury has many advantageous qualities for the service contemplated. The high skin effect or surface tension, tending to raise a considerable meniscus, allows positioning the container an appreciable distance away from the moving surface and still have the mercury in contact with the surface. Furthermore, the same quality tends to hold the body of mercury together and prevent the rapidly moving heated surface from tearing the body of mercury to pieces and throwing it or carrying it in the direction of rotation of the roll. Furthermore, mercury is known to have a very high coefficient of electrical and heat conductivity.

Completely surrounding the container 58 is a wiper of felt or similar material 60 which serves several purposes. In the first place, if there is any tendency whatever for the mercury to be carried in the direction of rotation of the roll, it cannot get past the felt at the edge of the container wiping the roll. In the second place, the felt seal traps a certain amount of air between the container 58 and the moving surface, thus minimizing cooling and oxidation of mercury. In the third place, it wipes the roll continuously, thereby preventing lint or other foreign matter carried on the roll from getting to the mercury. The viscosity and other characteristics of the mercury tend to roll it over and over in its depression 59, thus insuring that the body of the mercury is as nearly as is possible at the temperature of the moving surface. Furthermore, I completely lag the container 58 and mercury with asbestos or other insulating material as at 61, to minimize heat radiation.

The resistance thermometer element 24 is positioned in the body of the mercury, with the necessary conductors 10 leading therefrom, as may be clearly seen in Figs. 4 and 5. Preferably the resistance 24 is of enameled wire, fused in glass, or otherwise protected against short circuiting by the mercury, while adapted to be fully sensitive to the temperature of the mercury pool.

In Fig. 5, I additionally show a thermocouple 62 positioned in the mercury, for it is contemplated that a potentiometer-thermocouple circuit may equally as well be used in the general arrangement for measuring the temperature of the mercury and thereby the temperature of the heated surface moving past the contacting strip of mercury. It will be clearly seen that through this arrangement a substantially frictionless contact is made by a good heat-conducting material, namely, mercury between the heated moving surface and the resistance thermometer 24 or the thermocouple 62.

To facilitate the heat transfer from the roll to the mercury, I may have the mercury in contact with an insert in the roll, of a material which is wetted by mercury. For example, in Fig. 6 I illustrate a ring of brass 63 embedded in the roll and with which the mercury makes a wetted contact. In Fig. 8, I illustrate a ring insert 64 of insulating material and within it a second inserted ring 65 of brass, for example, to which is connected one terminal of a thermocouple 66 positioned at the surface of the roll. A similar insulating insert 67 and brass insert 68 are shown for the other lead of the thermocouple 66; and adjacent the brass rings 65, 66 are positioned two contacting pools of mercury, to each of which is led a conductor. Thus, one or more thermocouples, as 66, may be located at the very surface of the roll and the potential generated thereby led out through mercury contacting with the metallic rings 65, 68.

At Fig. 7 I illustrate an ordinary mercurial thermometer positioned in the mercury pool of the depression 59, which thermometer may be read visually to obtain an indication of temperature at the heated roll surface.

It is evident that I may have a plurality of pools of liquid contacting a moving surface, and in each a resistance or thermocouple, for obtaining an average temperature; or I may have a plurality of resistances or thermocouples positioned in a single pool of contacting liquid.

While I have illustrated and described certain preferred embodiments of my invention, it will be understood that it may take many other forms and that I am to be limited only as to the claims in view of prior art.

What I claim as new, and desire to secure by Letters Patent of the United States, is:—

1. Apparatus for determining the temperature of rolls, comprising in combination, a container positioned with slight clearance relative to the outer surface of the roll, a relatively long narrow non-rotating pool of mercury in the container contacting the roll surface in a line parallel to the roll axis, and temperature sensitive means located in the mercury.

2. A measuring device for determining the temperature of a moving surface comprising a relatively stationary container positioned adjacent a portion of said surface, the container having a pocket with a flange extending from all sides thereof parallel to said surface and spaced a slight distance therefrom, a liquid in said pocket contacting the moving surface, and means for measuring the temperature of the liquid.

3. Apparatus for determining the temperature of a moving surface, comprising in combination, a relatively stationary container positioned adjacent but not touching the moving surface, a pool of mercury in said container, a portion of the surface moving past the container being of a material wetted by mercury, the mercury contacting said portion, and means positioned in the mercury for determining the temperature thereof.

4. Apparatus for determining the temperature of a moving surface, comprising in combination, a relatively stationary container positioned adjacent but not touching the moving surface, a pool of mercury in said container, the mercury contacting the moving surface, a resistance element in the mercury, a Wheatstone bridge circuit including the resistance element, and a galvanometer sensitive to unbalance of said circuit.

5. In an apparatus for measuring and/or controlling the temperature of a moving surface, a relatively stationary container positioned adjacent a moving surface, a pool of mercury in the container and contacting the moving surface, temperature sensitive means submerged in said pool of mercury, an electron discharge device having an input and an output circuit, said input circuit controlled by said temperature sensitive means, a transformer, the secondary of said transformer connected in said output circuit, and a measuring and/or controlling device having an electromagnetic winding controlled by the current in the primary winding of said transformer.

6. Apparatus for measuring the temperature of a heated moving surface, comprising in combination, a relatively stationary container positioned adjacent to the moving surface, a pool of liquid in the container and contacting the moving surface, and a temperature sensitive device submerged in the liquid.

7. Apparatus for measuring the temperature of a moving surface comprising in combination, a relatively stationary pool of liquid having a convex meniscus and disposed relative to the moving surface whereby the meniscus engages the moving surface directly, and a temperature sensitive device submerged in the liquid.

8. In combination, a machine having a plurality of heated rolls, temperature sensitive means for determining the surface temperature of each of the rolls, control means of the heating for each of the rolls, an electric measuring circuit including a galvanometer, means for periodically connecting the temperature sensitive means of each roll successively into said circuit, and means for simultaneously operating the control means for the same roll from the galvanometer.

RAYMOND D. JUNKINS.